Figure 1:
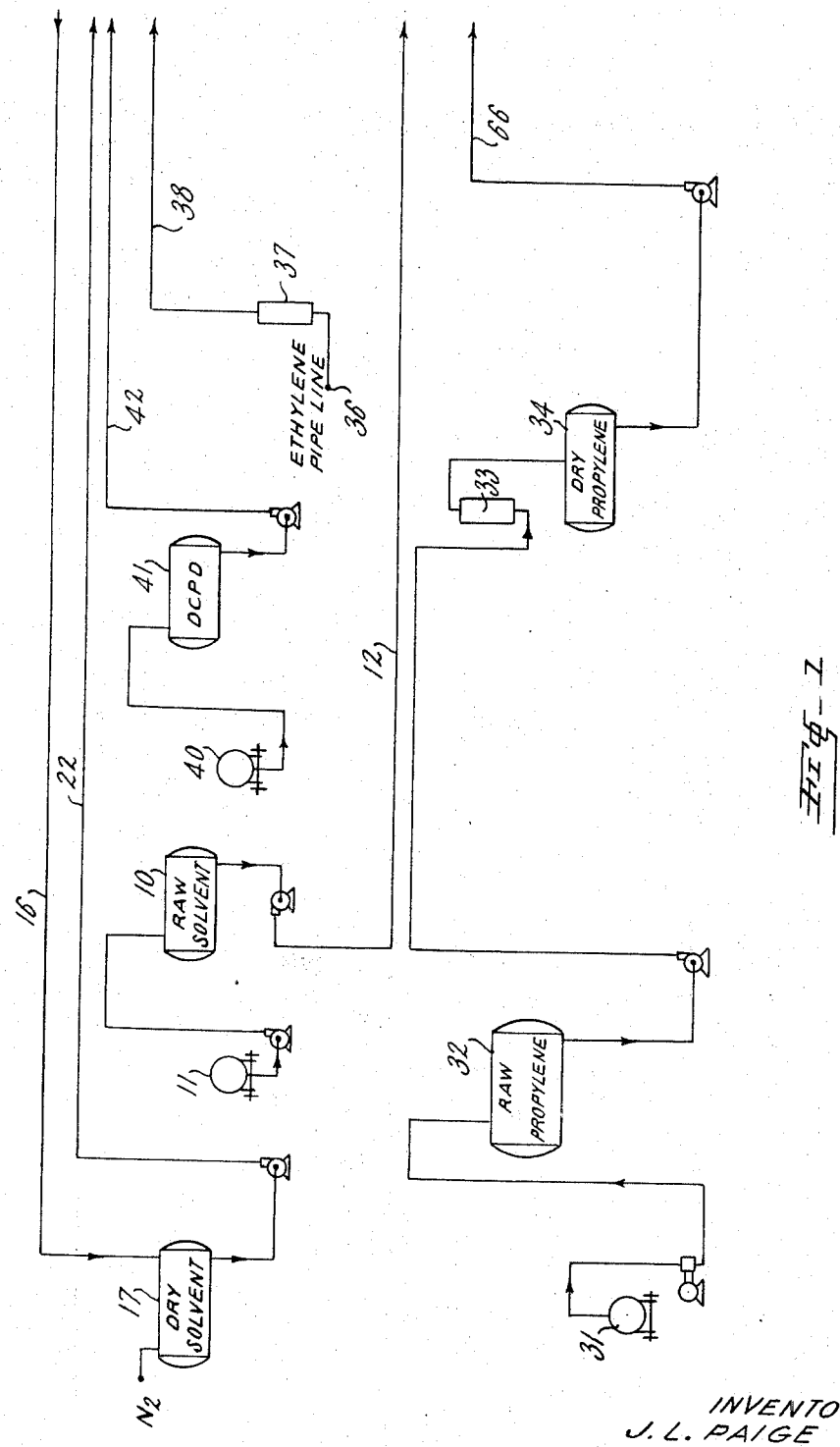

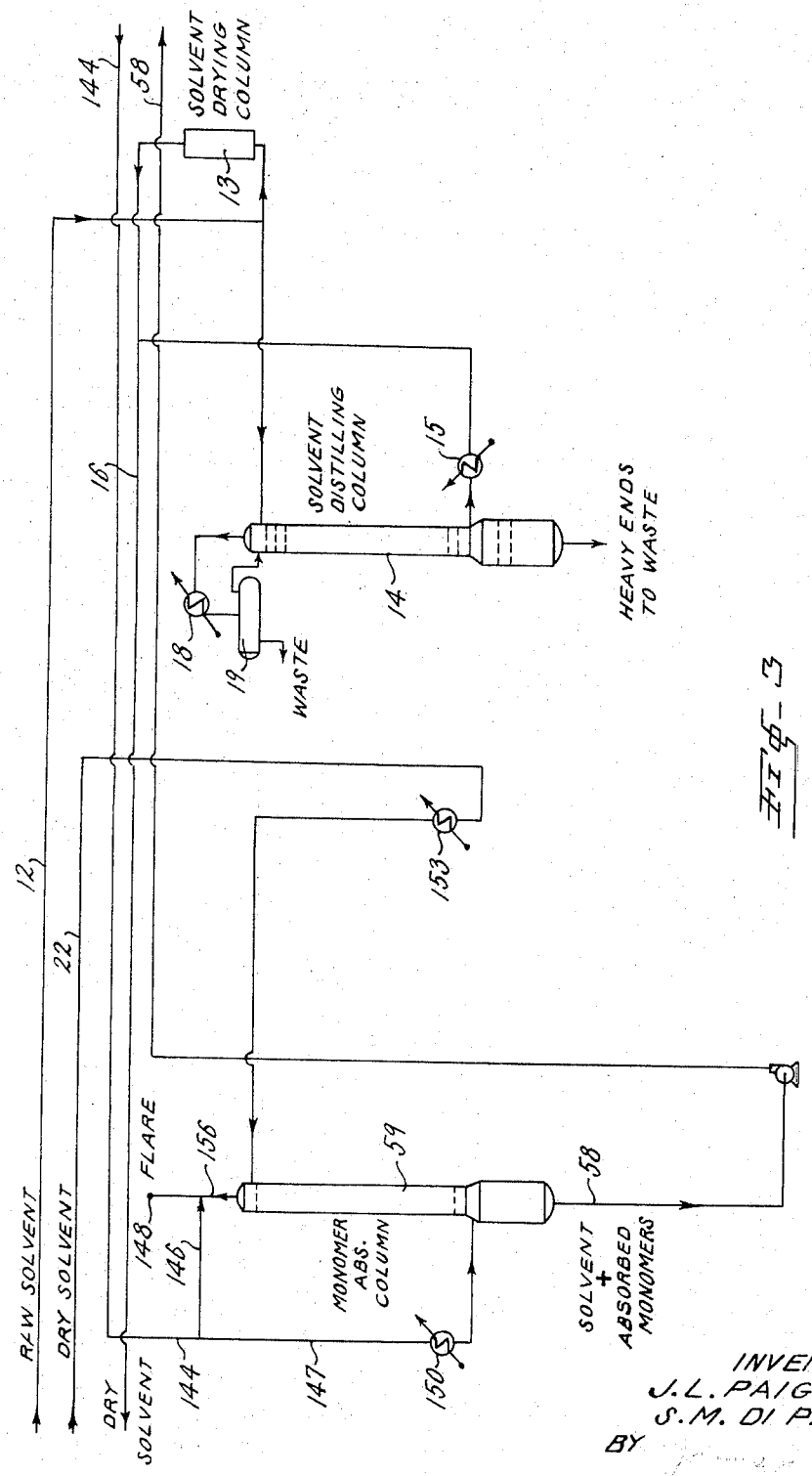

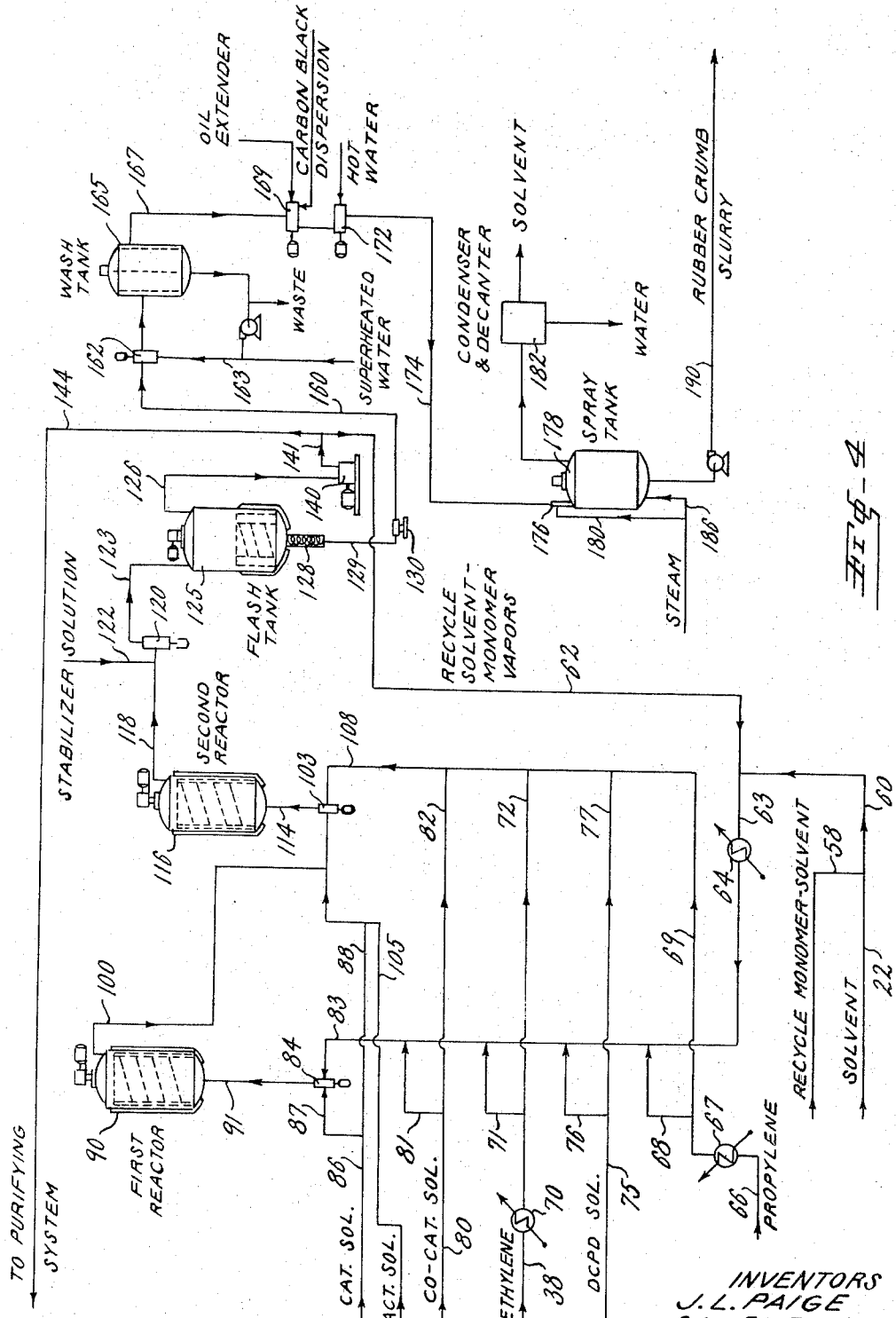

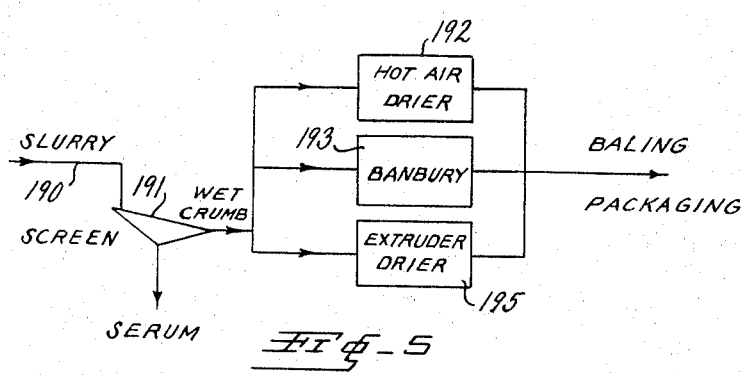
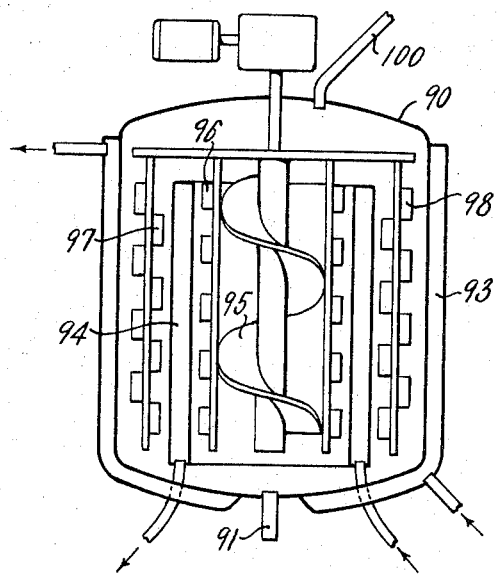

United States Patent Office 3,341,503
Patented Sept. 12, 1967

3,341,503
OLEFIN POLYMERIZATION PROCESS USING A PRE-MIX ZONE
John L. Paige, Naugatuck, Conn., and Sebastian M. Di Palma, Baton Rouge, La., assignors to Uniroyal, Inc., a corporation of New Jersey
Filed July 17, 1964, Ser. No. 383,329
3 Claims. (Cl. 260—80.78)

This invention relates to a method of making olefin polymer, and more particularly it relates to the copolymerization of two different olefins, especially ethylene and propylene. The invention is particularly directed to a continuous method for making an unsaturated, sulfur-vulcanizable terpolymer of ethylene, propylene and a copolymerizable non-conjugated diene such as dicyclopentadiene, 1,4-hexadiene, methylene norbornylene, cyclooctadiene-1,5, or the like (such non-conjugated unsaturates may be characterized as "diolefins" in the sense that they contain two olefinic-type double bonds).

The polymerization process with which the invention is concerned involves the polymerization of the aforesaid monomers in solution in an inert organic solvent with the aid of a polymerization catalyst of the type based on a principal catalyst component which is a transition metal compound, such as a vanadium salt or the like, along with a co-catalyst which is a reducing agent or complexing agent, such as an organoaluminum compound. Various schemes for carrying out such a copolymerization have been proposed in the prior art but in practice great difficulties are encountered, especially when it is desired to carry out the polymerization continuously and conveniently in an economical manner. In the first place the polymerization is dependent upon the reaction product of catalytic ingredients. Control of the polymerization presents a problem because great quantities of heat are liberated in the course of the polymerization; the problem of control is complicated because the polymerization is influenced also by the relative concentration of monomers and the availability of active catalyst formed by the aforementioned reaction of catalytic ingredients. The rate of polymerization is dependent upon the total monomer concentration in the solution as well as the concentration of active catalyst.

The invention is directed to an improved continuous process in which unreacted monomers are recovered in gaseous form and are re-cycled and pre-combined with solvent which is chilled to completely dissolve the gases and to provide a large volume of low temperature material which serves as a heat sink to absorb a substantial portion of the heat of polymerization. Pre-chilling this feed, as well as makeup monomers added to various stages in the process, insures complete solution of all the monomers to the reactor train.

In accordance with another important feature of the process of the invention, the catalyst ingredients are combined in the pressence of monomers in high shear, in line mixers prior to each polymerization stage of the reactor train. The mixers impart good mixing to the combination of all the feed streams to each stage of polymerization, i.e., intense mixing of small volumes of materials continuously discharging to the reaction stages.

The invention accomplishes its desired objects by conducting the polymerization in a single phase liquid which fills the reaction zones in all stages of the polymerization. The primary advantage of this liquid full mode of operation versus a more conventional vapor-liquid equilibrium system is that the gaseous monomers are pre-dissolved in the inert solvent. Thus the reactants are at the site of polymerization and the rate of solubilization of monomers from the gaseous to the liquid phase does not become a limiting parameter on the kinetics of the polymerization. Pressures are maintained, by feed pumps, in excess of saturation pressures at the monomer concentration and polymerization temperatures used. In the process, the concentrations of monomers are independent variables set only by the feed rates. The polymerization reaction takes place in scraped surface, high heat transfer surface devices whose important function is to provide good heat transfer capability.

Accordingly, as will appear in more detail in the following detailed description, the important features of the polymerization; active catalyst formation, concentration of monomers in solution, ratio of monomers in solution and heat transfer are effected and controlled in particular maner. These features comprise a combination of steps that is believed to be unique in the art of solution polymerization.

The invention will be described with reference to the accompanying drawings, wherein:

FIGS. 1 to 5 are purely diagrammatic flow sheets representing one embodiment of the invention; and FIG. 6 is a purely diagrammatic sectional elevational view of a reaction vessel suitable for use in the invention.

It will be understood that in the flow diagrams such accessory details as valves, flow rate controllers and indicators, temperature indicators, pressure indicators, and the like, have been omitted for simplicity and clarity.

In a preferred form, the invention contemplates making a sulfur vulcanizable rubbery copolymer of at least two alphaolefins and a small amount of at least one copolymerizable diene; these monomers are dissolved in an organic solvent, and the solution, which is cooled to a temperature of from 15 to 50° F., is advanced through a plurality of large volume reaction zones arranged in series. Each reaction zone typically has a volumetric capacity of from 20 to 200 times the volume of solution flowing in one minute, and is preceded by a small volume in line intensive mixing zone through which the solution passes prior to entering such reaction zone. Each mixing zone typically has a volumetric capacity of only about 0.05 to 1.5% of the volumetric capacity of the succeeding reaction zone. The active catalyst is formed in situ in the first mixing zone by bringing together in that zone, in the presence of the monomers, the principal catalyst ingredient, usually a vanadium compound such as vanadium oxytrichloride or vanadium tetrachloride or equivalent heavy metal (transition metal) halide or the like, and the co-catalyst, which is usually an organoaluminum compound (particularly an organoaluminum compound in which the organic moiety is an alkyl group), frequently an orgganoaluminum halide, especially an alkylaluminum halide (alkylaluminum sesquihalide being preferred), or equivalent substances selected from the suitable co-catalysts known in this art. In the first mixing zone an exothermic polymerization reaction begins immediately but the solution is instantly transferred to the first reaction zone. The interior surfaces of the reaction zone are continuously scraped and the solution is agitated, while applying external cooling to the reaction zone. This insures effective heat transfer and makes it possible to maintain the temperature of the reaction mixture within the range represented by a minimum of about 40° F. and a maximum of about 150° F. The polymerization mixture as withdrawn from the first reaction zone is relatively viscous and contains polymer representing a conversion of from 20 to 80% of the introduced monomers (all quantities are expressed herein by weight, unless otherwise stated). There is introduced to the withdrawn polymerization mixture a solution, cooled to 30–60° F., of additional ethylene, propylene and diene, and catalytic ingredients, in a second small volume in-line intense mixing and shearing zone, and immediately this mixture is passed into the second large volume reaction zone which may be operated under conditions similar to the first reaction zone. This alternating of small volume high shear zones, in which more ingredients are introduced, with large volume polymerization zones, may of course be repeated any appropriate number of times, as desired. The finally withdrawn mixture is typically comprised of about 40 to 90% solvent, 5 to 12% dissolved polymer, 1 to 50% unreacted monomers and 0.1 to 6% inerts.

One important feature of the invention resides in the fact that the polymerization solution is maintained entirely in a liquid state throughout the polymerization, that is, there is no gas phase in the train of mixing zones and polymerization zones. The invention provides for limiting the accumulation of non-condensable gases (i.e., non-condensable under the conditions of the polymerization) so that the concentration of such materials remains below the limit of solubility of those materials under the conditions of polymerization. It will be understood that the materials introduced to the polymerization process almost inevitably include trace impurities which are substantially inert under the conditions of polymerization. The impurities include materials that are normally gases under the polymerization conditions, but initially they are present in amount less than the upper limit of their solubility in the polymerization mixture. However, it is desirable to return recovered solvent and monomers to the start of the process, and this unfortunately inevitably leads to a buildup in the concentration of these inerts or "light ends" to the point where eventually, if not controlled, their concentration would exceed the amount which will dissolve in the reaction mix. That condition would result in formation of an undesired gas phase in the polymerization stream. The invention accordingly provides a way of putting a ceiling on the concentration of non-condensable inerts in the system. In accordance with this aspect of the invention, provision is made for venting or purging an amount of such impurities at least equal to the amount being introduced to the polymerization in the fresh materials when the system is in equilibrium. Futhermore, the invention provides a way of effecting such venting or purging while providing for recovery and re-cycling of unreacted monomers to the maximum extent possible, consistent with economical removal of the inerts. The invention takes advantage of the fact that vapors (unreacted monomers, some solvent vapor, and non-condensable gases) flashed off from the polymerization solution after it leaves the last polymerization zone are many times richer, typically 3 to 10 or more times richer, in the non-condensable impurities or inerts than are the materials being freshly introduced to the polymerization. For example, whereas the concentration of the inert material propane in the monomers feed might be of the order of only 0.3 to 8%, the concentration of propane in the flashed off stream of vapors at the conclusion of the polymerization might be of the order of 5 to 25% or more after the system has come to equilibrium. The invention contemplates dividing the flashed off vapors into a major gas stream amounting to from about 85 to 95% of the total flashed off vapors and a minor gas stream amounting to from about 15 to 5% of the total flashed off vapors. Only the minor stream is relied upon to dispose of the required amount of inerts (non-reactive gases). The major stream is re-cycled to the start of the process. The minor stream contains the inerts or unreactive gases in an amount in excess of the amount of such impurities being introduced with new materials. Hence, by getting rid of a large part of the gaseous impurities in the minor stream, the system is prevented from developing an increasing concentration of inerts (which would ultimately lead to an undesired gas phase in the polymerization system, once the amount of inerts exceeded the amount that is soluble in the polymerization medium under the reaction conditions). To accomplish the desired purpose while still conserving for re-use as much of the unreacted monomers as possible we divide the described minor stream into two further sub-streams of gas, one of which represents from about 0.2 to 0.5% of the originally flashed off stream and the other of which represents the remainder of the minor stream. The first such sub-stream may simply be vented out of the system, for example, it may be passed to a flare stack; this sub-stream contains some of the unreacted monomers but only a relatively small proportion of monomers is lost in this way. The remaining sub-stream is subjected to a treatment which removes the bulk of the unreacted monomers contained therein, and also serves to separate such monomers from less soluble inerts, notably methane. This is preferably accomplished by contacting the said remaining sub-stream of gas with a quantity of the solvent. A convenient way of doing this is to scrub such sub-stream gas with solvent in liquid form, for example by counter-current flow in a scrubbing tower or absorption tower or similar liquid-gas contacting device. Thus, the gas stream (preferably pre-cooled) may be introduced near the lower portion of a conventional absorption column, while solvent liquid (preferably pre-cooled) may be introduced at the top of the column. As the gas flows (upwardly) countercurrently to the solvent (downwardly), the solvent takes out of the gas a large proportion of the monomers therein and leaves the gas relatively richer in the least soluble impurities (e.g., methane). The methane-enriched gas stream issuing from the top of the column may be purged out of the system, for example by venting to a flare stack. The monomer-enriched liquid solvent is recycled to the polymerization system. The purpose in sending some of the flashed off stream directly to flare without going through the absorber column is to get rid of more soluble inerts (particularly propane) which would undesirably be for the most part returned to the system if all of the monomer stream went through the absorption column (because the solubility of the propane in the solvent is relatively high, like that of the monomers). For this reason, the minor stream is split into two sub-streams, one of which goes through the absorption column, as described, and the other of which is vented directly. This arrangement provides the maximum recovery of monomers, consistent with removal of least soluble inert (methane) and most soluble inert (propane).

In more detail, and referring to the drawing, particularly FIG. 1 thereof, the solvent employed in the process contained for example in a storage tank 10 supplied from a tank car 11, may be any suitable conventional organic solvent, usually a straight chain hydrocarbon in the $C_3$ to $C_9$ range, preferably hexane, although aromatic solvents such as benzene can be used, as well as substituted hydrocarbons, especially halogenated, e.g., dichloroethylene. The solvent may be purified by any conventional method. Frequently we use either of two methods. One is by passing it through a connecting line 12 (FIGS. 1, 3) leading to one or more columns 13 (FIG. 3) containing a desiccant, such as sodium or calcium alumino silicate (although silica gel or activated alumina are sometimes used). Such purification columns serve the purpose of removing water and other impurities which might otherwise destroy the polymerization catalyst.

The second method is to dry and purify the solvent in a distilling column 14 (FIG. 3). In this process the solvent is fed to the distilling column close to the top and a water-solvent azeotrope is removed from the top, while heavy ends are removed from the bottom and discarded; the dried purified solvent vapor is removed just above the bottom, and after passing through a condenser 15 is passed to a return line 16 (FIGS. 3, 1) leading to a purified solvent storage tank 17 (FIG. 1), where it is stored under inert gas, and from which it may be pumped to a number of different parts of the process. The water-solvent azeotrope vapors passing out of the top of the solvent distilling column 14 (FIG. 3) may be condensed in a condenser 18. The resulting two phase liquid may be separated in a reflux decanter 19; the water phase may be eliminated to waste while the solvent phase is reintroduced as reflux into the distilling column 14.

A preferred form of the process utilizes an activator for enhancing the effect of the catalyst. Such activator may be an oxidant which can be a compound of the type represented by nitroalkanes, quinones, azoxybenzene or sulfur, or it may be phosphorus trichloride, or other suitable activator. Usually a nitroalkane, such as nitropropane, is preferred. More than one activator can be used. Thus, referring to FIG. 2, nitropropane activator contained in a supply drum 20 may be introduced to an activator solution make-up tank 21, along with solvent introduced through a line 22 (FIGS. 2, 1) leading from the dry solvent storage tank 17 (FIG. 1), to make a solution containing, e.g., 12% by weight of nitropropane.

Similarly, a supply of the catalyst, e.g., vanadium oxytrichloride, contained in a tank 25 (FIG. 2) may be introduced to a catalyst solution make-up tank 26, along with sufficient solvent to make a solution containing, e.g., 6% by weight of vanadium oxytrichloride.

The co-catalyst, that is, the aluminum alkyl type compound, e.g., ethyl aluminum sesquichloride, may be transferred from a supply tank 28 to a co-catalyst solution make-up tank 29, into which sufficient solvent is also introduced to make a 10% by weight solution, for example.

Liquid propylene, arriving for example in a tank car 31 (FIG. 1), may be transferred to a crude propylene storage tank 32, after which it may be passed through a desiccant purification column 33 and thence into a dry propylene storage tank 34. The desiccant column is usually packed with sodium or calcium alumino silicates although silica gel or alumina are sometimes used. The column serves the purpose of removing water and other impurities that might be harmful to the polymerization.

Ethylene is usually received at the polymerization plant by a pipeline 36 (FIG. 1), and is passed through a purification column 37 of the type described in connection with purification of the solvent and propylene. It is then piped to various parts of the process through a line 38.

The third monomer, that is, the non-conjugated diolefinically unsaturated monomer, which is preferably dicyclopentadiene (DCPD), may be received for example in a tank car 40, from which it is transferred to a storage tank 41, and thence by a line 42 (FIGS. 1, 2) to a T-mixer 43 (FIG. 2), at which point sufficient dry solvent is incorporated to provide a 67% by weight solution. The solution passes into a decanting tank 44. A 5-10% by weight aqueous solution of caustic, prepared in a make-up tank 45, is introduced to the DCPD solution, by means of a connecting line 48 leading to a T-mixer 49, before the DCPD solution enters the decanting tank 44. The operation is such that the aqueous caustic solution and DCPD solution are brought into intimate contact, to extract the polymerization inhibitor that is contained in the DCPD as supplied by the manufacturer. After decanting off the inhibitor-free DCPD solution, from the decanting tank 44, it is passed through a desiccant purification column 51 of the type used for the solvent and other monomers, and is then collected in a dry storage tank 52.

The ethylene-propylene-diene terpolymer, or the ethylenepropylene copolymer if desired, is polymerized in a chain of reactors ranging from one to five or more in number, arranged in series and/or in parallel. Although the polymerization can be carried out batch-wise in one reactor, a continuous polymerization process with a plurality of reactors arranged in series is usually employed.

In the particular embodiment of the invention illustrated in the drawings, a two reactor continuous chain is employed.

The purified solvent is pumped from the storage tank 17 (FIG. 1) through the transfer line 22 (FIGS. 1 and 4) which is joined by a liquid stream 58 (FIGS. 4, 3) of recovered monomers dissolved in solvent from an absorption column 59 (FIG. 3) to be described subsequently.

A mixed stream 60 (FIG. 4) formed by joining of the solvent stream 22 and monomer-solvent stream 58 is thereafter joined by a stream 62 of re-cycled vapor (comprised of unreacted monomers and solvent) which has been flashed off from the polymer solution which results from the polymerization reaction, in a manner to be described in detail hereinbelow. A mixed stream 63 resulting from the combination of streams 60 and 62 passes through a cooling device 64 which cools the stream to a temperature of, for example, 20° F. This serves the purpose of dissolving the monomers which were present as vapor in the flashed off stream 62 (the considerable heat of solution which is thereby evolved is absorbed in the cooler 64) and of lowering the overall heat content of the system so that the heat of polymerization evolved in the reactor will not raise the temperature of the system to as great an extent as would otherwise occur.

Purified propylene, from the purified propylene storage tank 34 (FIG. 1) is passed as a liquid through a line 66 (FIGS. 1, 4) to a chiller 67 (FIG. 4) which cools it to a temperature of about 30° F. The cooled liquid propylene stream is split into two streams 68, 69 (FIG. 4) one of which (68) is introduced to the common stream 63 delivered from the common stream chiller 64, and the other of which (69) passes to a second polymerization stage to be described subsequently.

In a similar manner, ethylene (gas) from the ethylene purification column 37 (FIG. 1) passes through the ethylene delivery line 38 (FIGS. 1, 4) to an ethylene chiller 70 wherein it is cooled to about 30° F. Thereafter the cooled ethylene gas stream is split into two streams 71, 72 (FIG. 4), one of which (71) joins the cooled common stream 63 and the other of which (72) passes to a second polymerization stage to be described subsequently.

Dry DCPD (dicyclopentadiene) solution is transferred from the dry DCPD solution storage tank 52 (FIG. 2) through a line 75 (FIGS. 2, 4); again, this is split into two lines 76, 77 (FIG. 4), one of which (76) joins the common stream 63 and the other of which (77) goes to the next polymerization stage, to be described.

The co-catalyst solution (ethyl aluminum sesquichloride solution) is pumped from the co-catalyst solution storage tank 29 (FIG. 2) through a line 80 (FIGS. 2, 4), which likewise splits into two parts 81, 82 (FIG. 4), one of which (81) joins the common stream 63 and the other of which (82) goes to the next polymerization stage, to be described.

The resulting total common stream 83 thereafter passes to an in-line mixer 84. In the common stream 83 the introduced ethylene and propylene have dissolved and the resulting heat of solution has been absorbed with consequent rise in temperature in the stream 83 to about 30° F.

At the same time the catalyst solution (vanadium oxytrichloride) is pumped from the catalyst solution storage tank 26 (FIG. 2) through a line 86 (FIGS. 2, 4) which is split two ways 87, 88 (FIG. 4), one of which (87) goes to the in-line mixer 84, and the other of which (88) goes to the subsequent polymerization stage to be described. Thus, the catalyst solution and the co-catalyst solution become combined for the first time in the presence of the monomers in situ in the in-line mixer 84 which represents a relatively small volume high-shear zone, as described previously. By this arrangement, the catalyst and co-catalyst do not come together to react and form the active catalytic material until the catalyst and co-catalyst are in the presence of the dissolved monomers, whereupon the polymerization commences immediately.

The essential feature of the in-line mixer 84 is that it has an extremely small volume or hold-up, e.g., 0.1% of the volume of the first polymerization vessel 90, to the bottom of which the in-line mixer 84 feeds the liquid reaction mixture through a connecting line 91. The time of dwell in the mixer is very small (e.g., 2 seconds), and the mixing or agitation which takes place therein is intense. The importance of these features will be appreciated in view of the fact that as soon as the stated materials come together reaction starts to take place, with evolution of heat and increase in viscosity. By performing the intense mixing on a small rapidly transported pre-cooled volume the desired complete distribution of the catalytic materials in the monomers and solvent is achieved at the outset before substantial increase in viscosity (which would make uniform distribution of the catalyst difficult, especially in a large volume) takes place and before undue heat build-up occurs (which heat build-up is especially difficult to control in a large volume of material, particularly once the material has become viscous).

In one specific embodiment of the invention, the relative proportions of the various streams which go to make up the final combined charge stream 91 may be expressed on a weight basis, based on the entire stream 91 as 100%, when the system is operating in equilibrium, as follows:

| | Percent |
|---|---|
| Fresh solvent stream 22 | 55.7 |
| Recovered monomer-solvent stream 58 from absorption column | 6.56 |
| Monomer-solvent vapor stream 62 from flash tank | 31.5 |
| Fresh propylene stream 68 | 2.50 |
| Fresh ethylene stream 71 | 2.05 |
| DCPD solution stream 76 | .39 |
| Co-catalyst solution stream 81 | 1.15 |
| Catalyst solution stream 87 | 0.15 |

The composition of the resulting combined stream 91, in this embodiment of the invention may be, when the system is at a typical equilibrium, as follows:

| | Percent by weight |
|---|---|
| Solvent | 68.2 |
| Ethylene | 4.0 |
| Propylene | 21.1 |
| DCPD | 0.25 |
| Co-catalyst | 0.11 |
| Catalyst | 0.09 |
| Remainder (miscellaneous, inerts, impurities) | 6.25 |
| | 100 |

The temperature of the combined feed stream 91 just prior to entering the reactor 90 might be, for example 40–50° F.

The reaction vessel 90 has a capacity that is very large in comparison to the volume of material contained in the in-line mixer at any instant. Like the other parts of the polymerization train, the reactor is operated in a liquid full condition, with no gas phase or space. The advantages of this have been pointed out above.

An important feature of the reaction vessel is that provision is made for scraping the internal surfaces continuously so as to provide the best heat transfer possible from the reaction mixture (which soon becomes quite viscous as a consequence of the formation of polymer in the solution), and this along with continual vertical transport of the reaction solution through an internal draft tube, permits maintenance of substantial homogeneity throughout the polymerization solution along with most effective operation of cooling devices associated with the reactor. Thus, referring to FIG. 6, the polymerization reaction vessel 90 is provided with an external jacket 93 through which a cooling fluid is circulated. Within the reactor there is a vertical axial draft tube 94 which likewise has interior hollow passages through which cooling fluid is circulated, to provide increased cooling area. A central rotating screw-like agitating device 95 causes a continuous upward vertical transport of the polymerization mixture within the draft tube, with consequent continual downward flow of the polymerization mixture on the outside of the draft tube. The paddle-like agitating arrangement includes projecting scraper blades 96, 97 which continuously pass over the inner and outer surfaces of the draft tube to prevent any stagnation of the viscous polymerization medium on each surfaces; like-wise, projecting scraper blades 98 continuously wipe the inner walls of the reaction vessel. This arrangement insures the best possible heat transfer for efficient removal of the heat of polymerization, and it also insures that the polymerization mass will be maintained as homogeneous as possible.

In one specific embodiment of the invention, the time of dwell of the polymerization solution in the first polymerization vessel 90 might be 25 minutes, the pressure therein might be about 230 p.s.i.g. (pounds per square inch gauge) and the temperature of the viscous solution as it overflows from the upper portion of the reactor through an exit line 100 might be about 100° F., for example. The discharge from the first reaction vessel contains from about 50 to 60% of the total polymer to be produced in the system illustrated, and in the specific case under consideration, might have a viscosity of say 2500 cps. at 100° F.

Figure 2:
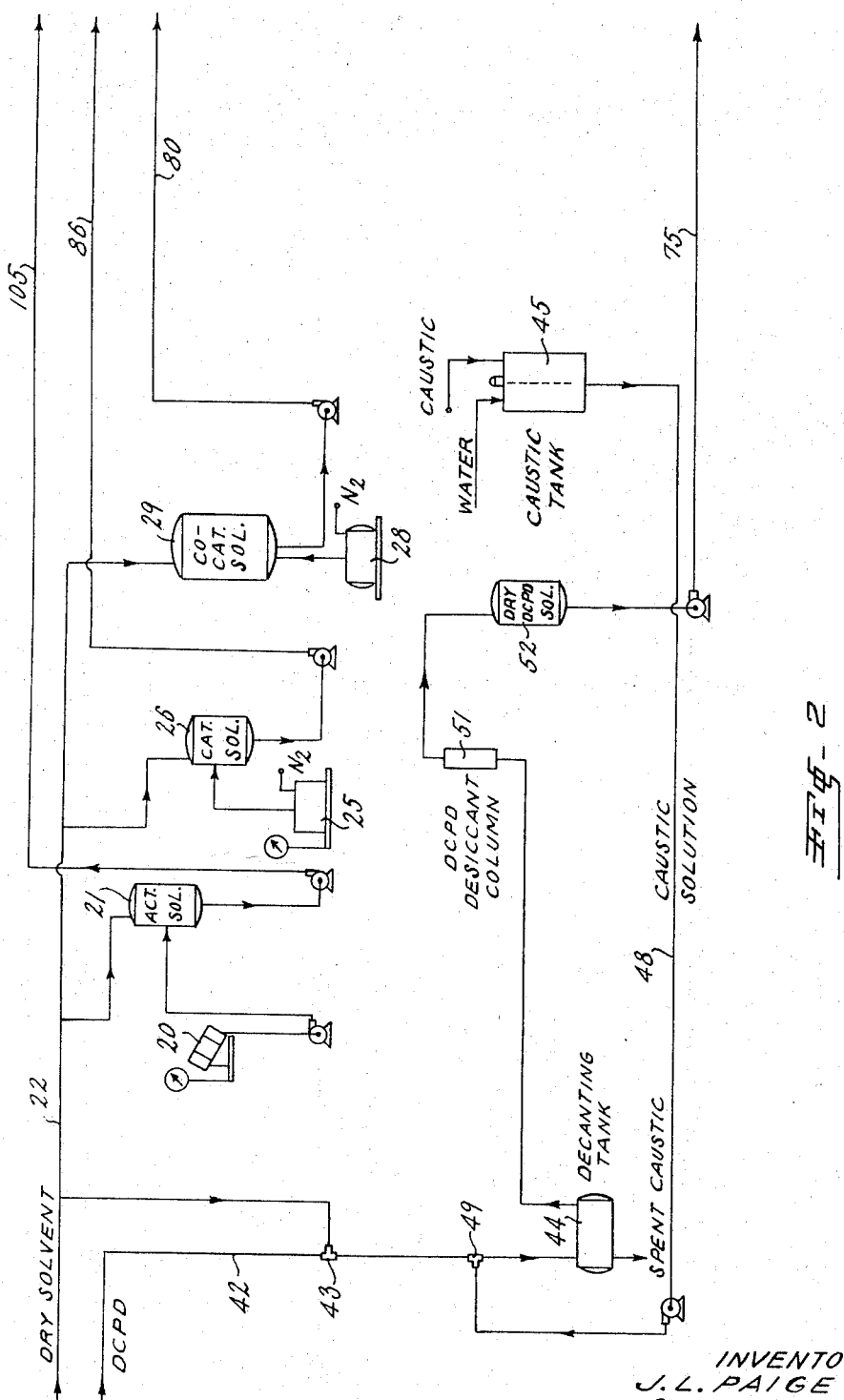

The discharge line 100 (FIGS. 6, 4) from the first reactor 90 is carried to a second in-line continuous mixer 103 (FIG. 4) which the partially reacted polymerization solution enters along with either additional catalyst solution introduced through the catalyst line 88, or else an activator solution (nitropropane solution) is here introduced through a line 105 (FIGS. 4, 2) leading from the activator solution storage tank 21 (FIG. 2). Also introduced to the second in-line mixer 103 (FIG. 4) is a new charge stream 108 made up of pre-cooled propylene introduced from the propylene line 69, pre-cooled ethylene introduced from the ethylene line 72, DCPD solution introduced from the DCPD solution line 77 and co-catalyst solution introduced from the co-catalyst solution line 82.

The second in-line mixer operates similarly to the first in-line mixer, that is, it is a small volume, continuous, high shearing intensity mixing zone through which the material flows rapidly while being violently agitated, with a minimum time of dwell. The only difference is that in the second in-line mixer the stream being mixed is more viscous since it includes the solution containing polymer from the first reactor.

The second in-line mixer delivers the mixed stream through a line 114 into a second reaction vessel 116 which is constructed and operated similarly to the first reaction vessel 90. In the particular embodiment of the invention described and illustrated, the relative proportions of the various streams which go to make up the mixed feed stream 114 to the second reactor, when the system is operating at a typical equilibrium, may be as follows:

| | Percent |
|---|---|
| Discharge stream 100 from first reactor | 94.3 |
| Make-up catalyst solution stream 88 or activator solution stream 105 | 0.14 |
| Make-up propylene stream 69 | 2.28 |
| Make-up ethylene stream 72 | 1.86 |
| Make-up DCPD solution stream 77 | 0.36 |
| Make-up co-catalyst solution stream 82 | 1.06 |

The composition of such second charge stream 114 in this example may be as follows:

| | Percent |
|---|---|
| Solvent | 65.5 |
| Ethylene | 3.74 |
| Propylene | 20.0 |
| DCPD | 0.26 |
| Make-up catalyst or activator | 0.09 |
| Make-up co-catalyst | 0.11 |
| Remainder (polymers, inerts, impurities, spent catalyst residues, etc.) | 10.3 |

The ratio of make-up propylene to make-up ethylene charged in the second stage is lower than the originally charged ratio of propylene to ethylene in the first stage to compensate for the fact that the ethylene copolymerizes more rapidly than the propylene.

The stream 114 charged to the second reactor might have a temperature of for example 100–110° F. The materials react in the second reactor under conditions similar to those existing in the first reactor, the only essential difference being that the solution in the second reactor is more viscous because of its higher polymer content. In one example the time of dwell in the second reactor might be 20 minutes, the pressure 210 p.s.i.g., and the discharge temperature 100° F. The overflow from the second reactor passes out at the top through a line 118. In one embodiment of the invention it might have the following composition (total 100%): 65.6% solvent, 8.5% polymer, 19.6% unreacted monomers, 6.3% inerts, catalyst residue, impurities, etc. The viscosity might be, for example, 15,000 cps. at 100° F.

It will be understood that more than two reactor stages may be employed in the manner described, with new additions of monomers and catalyst components to in-line mixers between stages, as described above. Suitably, additions of catalyst (vanadium oxytrichloride) after the first stage will be alternated with additions of activator or oxidant (nitropropane). Although any of the above-mentioned ingredients may be added at the second stage, usually only the three monomers plus oxidant (activator) are added. The new supply of monomers is necessary to support further polymerization, and the oxidant reactivates the catalyst. If more than a two reactor chain is used the third reactor will usually have catalyst, co-catalyst and the three monomers added. The fourth would usually have oxidant added along with the new supply of monomers and so forth alternating catalyst/co-catalyst and oxidant. As an optional stream, molecular weight modifiers may be added to any one or all of the reactors. For example, a small amount of an amine N-oxide (e.g., pyridine N-oxide) may be added to any suitable point or points as a regulator or modifier to control the molecular weight or viscosity of the polymer.

The discharge line 118 from the last of the train of reaction vessels feeds into an in-line mixer 120 along with a stream 122 of a stabilizer solution to protect the polymer against heat degradation. From 0.1 to 2.0 parts of stabilizer based on 100 parts of polymer are usually used. Conventional stabilizers and/or antioxidants such as the alkylated phenol, dithiocarbamate, phenolic sulfide or phosphite classes can be used either alone or in combination. For example, the stabilizer solution introduced in the line 122 may be a 2% solution of tris(nonylated phenyl) phosphite in hexane. The stabilized polymer solution passes from the in-line mixer 120 through a connecting line 123 into a vapor space in the upper part of a flash tank 125. In the flash tank the pressure is relatively low (e.g. 1 to 5 p.s.i.g., compared to the 160 to 200 p.s.i.g. pressure existing in the line 123), as a consequence of which the unreacted monomers, and some of the solvent, flash off as a vapor stream and pass out through a line 126 extending from the upper part of the vessel. The polymer, dissolved in the remainder of the solvent, forms a viscous cement-like pool in the lower portion of the flash tank. To aid in the flashing operation the polymer solution or cement is heated, typically to a temperature of about 110° F., by means of a heating jacket on the flash tank, and at the same time the solution or cement is agitated by an internal stirrer in the flash tank. Removal of the solution or cement from the bottom of the flash tank is aided by a rotating screw stuffer device 128 mounted at the outlet of the tank, from which the cement flows through a line 129 to a pump 130.

The flashed off monomer/solvent vapor stream 126 from the top of the flash tank is compressed in a compressor 140 to form a vapor stream, under a pressure sufficiently high to permit re-cycling to the first stage of polymerization; usually the pressure imparted in the compressor 140 is of the order of 145 to 160 p.s.i.g. The composition of the compressed flashed stream which passes into a line 141, is usually about 18.5% solvent, 62.5% monomers, and 19% miscellaneous (mainly inerts, e.g., methane, ethane and propane, introduced as impurities in the fresh monomers). The flash re-cycle line 62 connects the compressed flashed stream 141 to the common charge line 63 associated with the first reaction vessel as previously described. The flashed stream line 141 also feeds a connecting line 144 (FIGS. 4, 3) leading to a re-cycle monomer purifying system (FIG. 3). An important function of the re-cycle monomer purifying system is to prevent the amount of inerts in the system from building up to a concentration in excess of the solubility of these materials in the polymerization medium. Thus, to maintain a liquid full system in accordance with the invention it is necessary to take away on each cycle at least as much inerts as are inherently introduced with the fresh materials, otherwise there will be a continuing increase in the concentration of the inerts with each succeeding cycle of operation. However, in accordance with the invention it is not necessary or desirable to purify the entire recovered monomer/solvent vapor re-cycle stream. Rather, only a relatively small portion of the recycle monomer/solvent stream need be purified or purged, but from this small portion there must be removed in a given unit of time an amount of inerts at least equal to the amount of inerts introduced with the fresh material in that unit of time (when the system is in equilibrium), otherwise there will inherently be an undesirable build-up in the concentration of inerts. For this purpose, the line 144 leading off from the compressed flash stream 141 serves to direct about 9.3% of the compressed flashed stream 141 to a purifying system.

This diverted minor stream 144 (FIGS. 4, 3) is in turn split up into two sub-streams 146, 147 (FIG. 3). One such stream 146, amounting to about 0.3% of the total flashed off stream 141 (FIG. 4), is vented to a flare 148 (FIG. 3). This serves to purge the system of propane, the most soluble inert gas in the flashed stream. Although only a relatively small amount of the flashed stream is thus vented, nevertheless this small amount serves to remove as much propane as is being introduced to the polymerization system, because the concentration of propane in the flashed stream is much higher than the concentration of propane in the newly introduced raw materials. Some monomers are inevitably lost to the system in the flare 148, but the amount is relatively small. The remaining stream 147 split off from the diverted stream 144 (which might have a temperature of, for example, about 200–210° F.) is passed through a cooler 150 which reduces the temperature of the gas to say about 40° F. prior to the introduction of such gas stream to a point in the lower portion of the absorption column 59. The stream 147 of flashed gas which enters the absorption column typically amounts to 9% of the total flashed off stream 141 (FIG. 4). In the absorption column 59 (FIG. 3) this fraction of the flashed gas stream is counter-currently extracted with dry solvent, introduced by means of the line 22 (FIGS. 1, 3) leading from the dry solvent storage tank 17 (FIG. 1) to a cooler 153 (FIG. 3) which reduces the temperature of the solvent to about 25° F. before it passes into the absorption column 59 near the top thereof. In the absorption column the liquid solvent dissolves most of the monomers contained in the gas stream, but only a relatively small amount of least soluble inerts (e.g., methane) dissolve. Thus, there is withdrawn from the bottom of the column an absorber bottom stream 58 containing a large portion of the monomers that were in the gas stream 147, but only a small portion of the least soluble inerts, especially methane, that were in the stream 147. Further, there passes out of the top of the column an exhaust gas stream 156 (which is disposed of at the flare 148) that contains only a small part of the monomers that were introduced in the gas stream 147, but is relatively rich in the more insoluble inerts, especially methane. In this way the amount of less soluble inerts such as methane purged at the flare 148 at least equals the amount of such inerts being introduced to the system with new materials. The absorber bottoms stream 58 (which is returned to the feed system of the first polymerization vessel, FIG. 4) in one typical embodiment of the invention has the composition: 58.5% solvent, 31.8% monomers, 9.7% inerts and miscellaneous; the overhead light ends exhaust stream 156 typically has the composition: 3.8% solvent, 69.5% monomers, 26.7% inerts and miscellaneous, for example. The arrangement is such that loss of monomers from the system is maintained at a minimum, while at the same time insuring that the level of accumulation of inerts (both the inerts that are relatively soluble, and the inerts that are relatively insoluble) is controlled to prevent development of a gas phase in the reactor train for the operating levels of temperature and pressure, that is, the concentration of inerts is maintained below their maximum limit of solubility in the system.

Returning now to the treatment of the polymer cement, such cement, delivered by the pump 130 (FIG. 4), is next subjected to a washing operation to remove the catalyst residues, which are water-soluble. There are a number of ways of doing this. In a preferred way the pump 130 is connected by a line 160 to an in-line mixer 162 to which the cement is delivered, typically at a temperature of about 110° F. Superheated water (e.g., 300–330° F.) is also introduced to the in-line mixer through a line 163, and the resulting dispersion of cement in water (in approximately equal volume ratios) is discharged into a wash tank 165. The wash tank is essentially a vertical decanter provided with very slow (about 1 r.p.m.) baffled agitation designed to favor phase separation of the mechanical dispersion formed in the mixer 162. A separated phase containing the dissolved catalyst residues is removed from the bottom of the tank; about 10% of this is discharged to waste, the remainder is re-circulated to the hot water inlet line 163 to conserve heat. The separated washed cement phase is removed at the top of the tank through a line 167. The pressure in the washing system is usually of the order of 100 p.s.i.g. and the wash system is maintained totally liquid full.

If it is desired to make an oil masterbatch, any suitable conventional oil-extending material, including liquid asphalt heated to a temperature above its melting point, for example in amounts of 10 parts or less to 100 parts or more, per 100 parts of polymer may be mixed with the washed cement stream 167 in an in-line mixer 169. Similarly, if it is desired to make a carbon black masterbatch, carbon black may be introduced into the in-line mixer 169, conveniently in the form of a dispersion of the carbon black in solvent or oil or the like. If desired, oil extender and carbon black may be pre-mixed and introduced simultaneously rather than separately. The cement mixture from the in-line mixer 169, which is usually at a temperature of about 175–200° F., flows into another in-line mixer 172 where it is mixed with super-heated water (e.g. 250–350° F.) in equal volumes. The thus superheated water-cement dispersion passes through a line 174 leading to a dual fluid atomizing nozzle 176 directed into a vapor space in the upper portion of a coagulating tank 178. Steam is simultaneously fed to the atomizing nozzle, through a line 180, along with the cement-water dispersion to provide more heat and turbulence in the spraying operation. The solvent is thus flashed off and is carried overhead through a condensing and decanting system 182, whence the recovered solvent may be returned for combining with new solvent at the start of the process. As the solvent flashes off in the coagulating tank 178, the resulting small solid particles of polymer fall down into a body of violently agitated hot water in the lower portion of the coagulating tank. This water is maintained at a temperature of about 180–220° F. by steam sparged into the water through a line 186. In this way any residual solvent is driven off.

The resulting slurry of rubber crumbs in water may be pumped out of the bottom of the coagulating tank through a line 190 (FIGS. 4 and 5) onto a vibrating screen 191 (FIG. 5) through which the serum (hot water, containing any last traces of dissolved catalyst residue) passes, leaving the wet solid rubber crumb behind.

The wet polymer can then be dried in a number of ways. These include conventional hot air driers 192 (FIG. 5), Banbury driers 193 or extruder driers 195 of the Welding Engineers, French Press, Bauer or Anderson types. These systems can be used either alone or in combination. The dry polymer is then baled and packaged. In the specific embodiment of the invention illustrated, the resulting terpolymer rubber has the composition 42.8% (by weight) ethylene, 52.2% propylene, and 5% dicyclopentadiene. It has an intrinsic viscosity of 1.4 at 135° C. in tetralin.

Having thus described our invention, what we claim and desire to protect by Letters Patent is:

1. A method of making a rubbery ethylene-propylene-non-conjugated diolefin polymer comprising dissolving all of the said monomers in a volatile inert organic solvent, the solvent and monomers being prechilled to a temperature such that the temperature of the resulting solution is from 15 to 50° F., advancing the solution at a controlled rate of flow continuously into a mixing device followed by a reaction vessel in series with the mixing device, the volumetric capacity of the mixing device being from 0.05 to 1.5% of the volumetric capacity of the reaction vessel, introducing an aluminum alkyl-vanadium compound catalyst to the mixing device to effect thorough mixing of the catalyst with the solution and thus form a liquid polymerization mixture which immediately begins to react exothermically, immediately thereafter transferring the said polymerization mixture from the mixing device into the said reaction vessel, cooling and agitating the mixture in the reaction vessel to maintain the temperature of the mixture within the range of from 40° to 150° F., the volumetric capacity of the reaction vessel being from 20 to 200 times the volume of polymerization mixture flowing therethrough in one minute, the mixing device and polymerization vessel being maintained completely filled with the liquid polymerization mixture, continuously withdrawing from the reaction vessel a final mixture containing dissolved polymer, and recovering said polymer from the final mixture.

2. A method of making a sulfur vulcanizable rubbery copolymer of ethylene and propylene with a copolymerizable non-conjugated diene comprising dissolving all of the said monomers in a volatile inert organic solvent pre-chilled to a temperature such that the temperature of the resulting solution is from 15 to 50° F., advancing the resulting solution at a controlled rate of flow into and through a plurality of reaction zones arranged in series, each such reaction zone being preceded by an intensive mixing zone, introducing in the first said mixing zone separate solutions of alkyl aluminum halide and vanadium compound as active-catalyst-forming-ingredients in said solvent to effect in situ formation of active polymerization catalyst in the presence of the monomers and to effect substantially instantaneous thorough mixing of the catalyst with the monomers to form a liquid polymerization mixture which immediately begins to react exothermically, thereafter transferring the said polymerization mixture without appreciable delay from the first mixing zone to the first of said reaction zones, cooling and agitating the mixture in said first reaction zone to maintain the temperature of the mixture within the range of from 40° to 150° F., withdrawing from said first reaction zone a polymerization mixture in which part of the original monomers have been converted to copolymer, thereafter introducing to the withdrawn polymerization mixture additional monomers and catalyst ingredient solution, subsequently passing the mixture successively through at least one more series of intense mixing zone followed by large volume reaction zone at a temperature of 40°–150° F. to advance the polymerization, the said zones being maintained completely filled with the liquid mixture, and thereafter recovering polymer from the final mixture, each of the said mixing zones having a volumetric capacity of from 0.05 to 1.5% of the volumetric capacity of the reaction zone, and each reaction zone having a volumetric capacity of from 20 to 200 times the volume of liquid reaction mixture flowing therethrough in one minute.

3. A method of making a sulfur vulcanizable rubbery copolymer of ethylene and propylene and a small amount of dicyclopentadiene comprising dissolving all of said monomers and an alkyl aluminum halide co-catalyst in an inert volatile organic solvent, cooling the resulting solution to a temperature of from 15 to 50° F., advancing the solution at a controlled rate of flow into and through a plurality of reaction zones arranged in series, each reaction zone having a volumetric capacity from 20 to 200 times the volume of solution flowing in one minute, each such reaction zone being preceded by an in-line intensive mixing zone through which the solution passes prior to entering the reaction zones, each said mixing zone having a volumetric capacity of from 0.05 to 1.5% of the volumetric capacity of the succeeding reaction zone, introducing separately in the first of said mixing zones a catalyst comprising a vanadium salt to effect in situ formation of active polymerization catalytic material in the presence of the monomers and to effect substantially instantaneous thorough mixing of the catalyst with the monomers to form a polymerization mixture which immediately begin to react exothermically, thereafter transferring the said polymerization mixture from the first mixing zone to the first of said reaction zones, cooling the surfaces of the said first reaction zone, continuously scraping the surface of the said first reaction zone to insure effective transfer of heat of polymerization from the polymerization mixture, the temperature in the polymerization mixture in said first reaction zone thereby being maintained within the range of from 40° to 150° F., withdrawing from said first reaction zone a resulting relatively viscous polymerization mixture in which from 20 to 80% of the introduced monomers have been converted to polymer, thereafter introducing into the withdrawn polymerization mixture additional monomers and catalyst ingredient solution cooled to a temperature of 30 to 60° F., subsequently passing the material successively through at least one more series of in-line intense mixing zone followed by reaction zone to advance the polymerization under the same conditions as in the first reaction zone, the finally withdrawn mixture being comprised of 40 to 90% solvent, 5 to 12% dissolved polymer and 1 to 50% unreacted monomers, the said zones being maintained completely filled with liquid solution with no gas space, and thereafter recovering the polymer from the final mixture.

References Cited
UNITED STATES PATENTS

| | | | |
|---|---|---|---|
| 2,824,160 | 2/1958 | Knight et al. | 260—94.9 |
| 3,074,922 | 1/1963 | Dye et al. | 260—88.2 |
| 3,153,027 | 10/1964 | Hagemeyer et al. | 260—88.2 |
| 3,173,904 | 3/1965 | Friedlander et al. | 260—88.2 |
| 3,206,287 | 9/1965 | Crawford | 260—88.2 |
| 3,211,709 | 10/1965 | Adamek et al. | 260—80.5 |

JOSEPH L. SCHOFER, *Primary Examiner.*

W. HOOVER, H. WONG, *Assistant Examiners.*